(12) United States Patent
Kawahara

(10) Patent No.: US 6,487,126 B1
(45) Date of Patent: Nov. 26, 2002

(54) STORAGE DEVICE

(75) Inventor: Yuji Kawahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/494,855

(22) Filed: Feb. 1, 2000

(30) Foreign Application Priority Data

Jun. 30, 1999 (JP) .......................................... 11-186200

(51) Int. Cl.$^7$ ................................................. G11C 7/00
(52) U.S. Cl. ............................... 365/189.05; 365/225.5
(58) Field of Search .................... 365/189.05, 225.5; 710/56, 52; 711/113

(56) References Cited

U.S. PATENT DOCUMENTS 4,489,378 A    12/1984   Dixon et al.

FOREIGN PATENT DOCUMENTS

| JP | 55157051 | 12/1980 |
| JP | 375917 | 3/1991 |
| JP | 8115264 | 5/1996 |
| JP | 02001014109 A | * 1/2001 |

OTHER PUBLICATIONS

Hahn et al., "Improved Adaptive Replacement Algorithm for Disk Caches in HSM Systems," 1999 IEEE, pp. 128–140.

* cited by examiner

Primary Examiner—A. Zarabian
(74) Attorney, Agent, or Firm—Greer, Burns & Crain, Ltd.

(57) ABSTRACT

In a storage device having a read buffer for storing datum read out from a storage medium in the form of cache data, datum are sequentially stored in the read buffer, but the read buffer is not partitioned into a plurality of areas. In the event that a plurality of cache data areas, each of which is an assembly of datum continued in an address on the storage medium, exist in the read buffer, a weighting is applied for each cache data area in connection with an importance of a data save. An overwrite is performed on an area of the minimum weight, and at least data on an area of the maximum weight is saved.

10 Claims, 10 Drawing Sheets

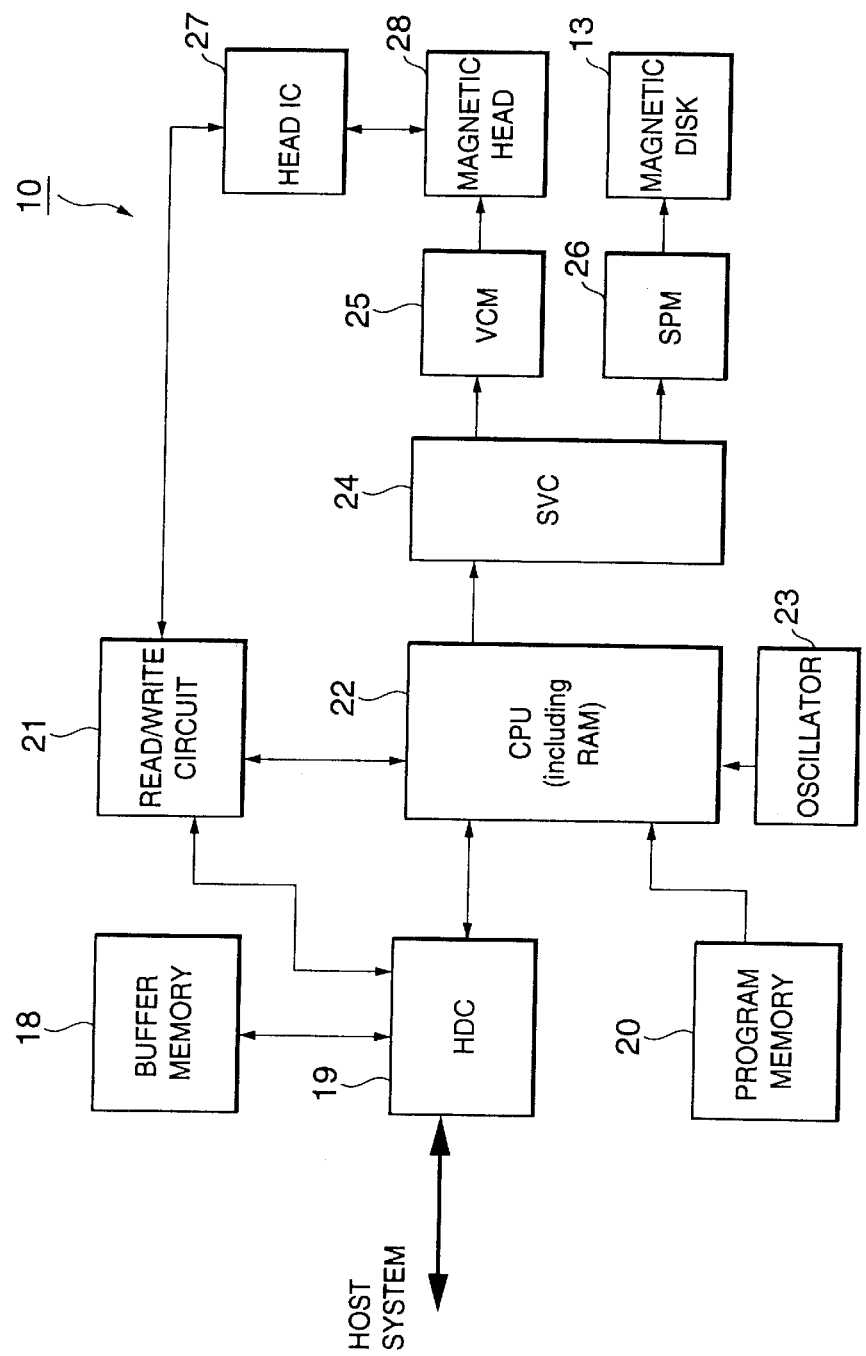

Fig.3

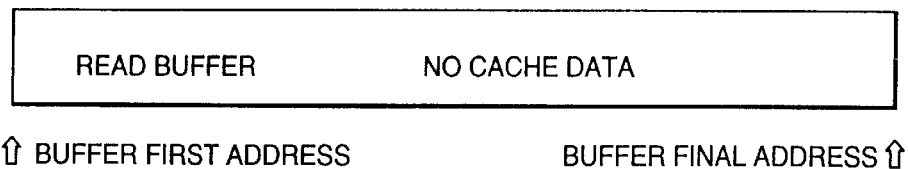

⇧ BUFFER FIRST ADDRESS　　　　BUFFER FINAL ADDRESS ⇧

Fig.4

⇩ ①READ DATA STORAGE START POSITION

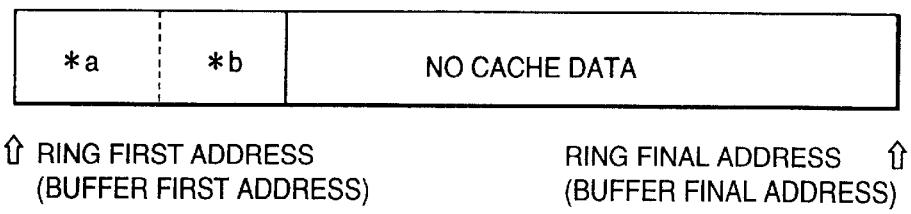

⇧ RING FIRST ADDRESS　　　　RING FINAL ADDRESS　⇧
(BUFFER FIRST ADDRESS)　　(BUFFER FINAL ADDRESS)

Fig.5

⇩ ②READ DATA STORAGE START POSITION

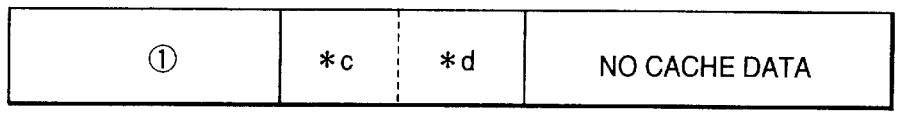

RING FIRST ADDRESS ⇧　　　　RING FINAL ADDRESS　⇧
　　　　　　　　　　　　　　(BUFFER FINAL ADDRESS)

Fig.6

⇩ ③READ DATA STORAGE START POSITION

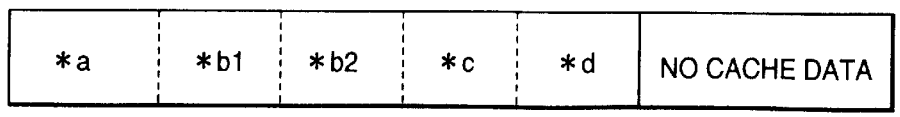

⇧ RING FIRST ADDRESS　　　　RING FINAL ADDRESS　⇧
(BUFFER FIRST ADDRESS)　　(BUFFER FINAL ADDRESS)

STORAGE DEVICE

BACKGROUND OF THE INVENTION

1. Field of the Invention

The present invention relates to a storage device, for example, a magnetic disk unit and an optical disk unit, wherein upon receipt of a read command issued by the exterior, for example, a host system, data is read out from a storage medium, for example, a magnetic disk and an optical disk, and is stored in a read buffer in the form of a cache data, and the cache data, which is stored in the read buffer, is transferred to the exterior (for example, a host system).

2. Description of the Related Art

Hitherto, in a magnetic disk unit for accessing a magnetic disk or an optical disk unit for accessing an optical disk, when such a disk unit receives a read command from a host system, the disk unit not only reads out data of data amount designated by the read command from a read first address designated by the read command, of a storage medium such as the magnetic disk and the optical disk, but also performs a so-called read-ahead in which an idle-time, until the next command is received, is utilized to continue the reading in order of the address. The data read out from the storage medium is stored in the read buffer in the form of cache data, and data requested by the read command, of the cache data stored in the read buffer, but the read-ahead data, is transferred to the host system which is a source of generation of the read command. When such a read-ahead is performed and then the subsequent read command is received, it is determined whether the data, which is requested by the received read command, is already stored in the read buffer. When it is determined that the data is already stored in the read buffer, the cache data stored in the read buffer is read out without accessing the storage medium and is transmitted to the host system. This contributes to shortening the access time.

Hitherto, as a storage scheme of data read out from a storage medium into a read buffer, there are known two schemes as set forth below.

(1) A scheme in which a one read buffer is fixedly partitioned into a plurality of segments each for storing the associated read command.

(2) A scheme in which a one read buffer is not fixedly partitioned into a plurality of segments, but datum (data requested from the host system and read-ahead data) for each read command are sequentially stored in read buffer.

According to the above-mentioned scheme (1), it is possible to simultaneously store on the read buffer a plurality of cache datum in which addresses on the storage medium are discontinuous. But according to the scheme (1), a cache size for each segment is restricted, since the read buffer is partitioned into a plurality of segments. Thus, in the event that a sequential read command (a read command wherein with respect to the final address of a read area on a storage medium, which is designated the past read command, the subsequent address is established as a read first address) is continuously issued, the device will be restricted in performance.

Further, according to the above-mentioned scheme (2), there is a high possibility that cache data stored in the read buffer by the read-ahead, which may be utilized later, is overwritten by data read out from the storage medium in accordance with a read command newly issued and the subsequent read-ahead data. Particularly, in the even that the sequential read command is sequentially issued, there is a high possibility of an overwrite. This is associated with a problem that the cache data, which is read out from the storage medium and is stored in the read buffer, cannot be efficiently utilized.

Further, as a modification of the above-mentioned scheme (1), there is known a scheme that a vacant area of a read buffer is managed in units of address so that only a read-ahead data is accumulated on the read buffer. According to this scheme, however, an address management for controlling this is complicated. Further, when a new read command is issued, it is complicated as to a determination whether data requested by the new read command is stored in the read buffer. Furthermore, according to the modification as mentioned above, there is a need to prepare an especial circuit for accessing data requested by the read command, in the event that the data is stored in the read buffer.

SUMMARY OF THE INVENTION

In view of the foregoing, it is an object of the present invention to provide a storage device capable of effectively holding on a buffer data which is not yet transferred, and thereby shortening an access time.

To achieve the above-mentioned objects, the present invention provides a storage device wherein data is read out from a storage medium in accordance with a read command entered from an exterior to be stored in a buffer, and the data stored in the buffer is transferred to the exterior, said storage device comprising:

read control means for performing such a read-ahead that when data requested by the present read command is not stored in said buffer, the data designated by the present read command is read out from said storage medium so as to be stored in areas of an address et seq. subsequent to a final address of an area in which data is already stored, and the data designated by the present read command is transferred to the exterior, and datum are read out continuously in turn from said storage medium to be stored in said buffer; and weighting means for applying weighting to a data area storing datum on which addresses on said storage medium are continued on said storage medium, on said buffer, in accordance with an amount of residual datum not transmitted to the exterior, in the data area.

In the storage device according to the present invention as mentioned above, it is acceptable that said weighting means performs weighting for each data area in accordance with at least one of an access frequency to the data area, an elapsed time since the data area is subjected to the last access, and a number of times of an issuance of an external read command since the data area is subjected to the last access, as well as the amount of residual datum not transmitted to the exterior.

In the storage device according to the present invention as mentioned above, it is preferable that said read control means provides such a control that when data requested by the present read command is not stored in said buffer, the data designated by the present read command is read out from said storage medium so as to be stored in a data area of the minimum weight applied to said weighting means, of said buffer.

In the storage device according to the present invention, datum read from the storage medium are sequentially stored in the buffer closely. This feature makes it possible to effectively use the buffer in its entirety. Further according to the storage device of the present invention, a weighting is applied for each data area separated in a discontinuous point in address on the storage medium, on the buffer, and an overwrite is performed on an data area of the minimum weight. This feature makes it possible to remain on the buffer much datum which are concerned with high possibility in the later use, and thereby contributing to the effective utilization of the cache data and also improving the access speed.

In the storage device according to the present invention as mentioned above, it is preferable that said read control means inhibits an overwrite on an data area of the maximum weight applied to said weighting means, of said buffer, and performs an overwrite on areas but the data area of the maximum weight, of said buffer, so that data read out from said storage medium is stored in said buffer.

When no vacant area exist in the buffer, a overwrite is performed on the data area of the minimum weight applied by the weighting means. However, even in a case where a need of the overwrite arises exceeding a size of the data area, a provision of the overwrite as to the data area of the maximum weight applied by the weighting means may contributing to a harmonization between the effective utilization of the cache data on the buffer and a requirement that a wide storage area on the buffer is ensured to store in the buffer data newly read out from the storage medium.

In the storage device according to the present invention as mentioned above, it is preferable that said weighting means performs weighting in such a manner that when a data area of the maximum weight of said buffer is accessed by said read control means, the maximum weight is applied to any data area of data areas but the accessed data area.

In some case, it happens that data requested by the read command newly issued exists in the data area of the maximum weight in the buffer. In this case, the data area of the maximum weight is accessed. In this case, an establishment of any one of the data areas but the data area of the maximum weight accessed to the maximum weight may contributing to a harmonization between the effective utilization of the cache data on the buffer and a requirement that a wide storage area on the buffer is ensured to store in the buffer data newly read out from the storage medium. When the data area having the maximum weight is accessed, at least part of the datum stored in the associated data area is read out therefrom and transferred. An amount of non-transferred datum of the data area is decreased, and as a result the weight of the data area is lowered.

In the storage device according to the present invention as mentioned above, it is preferable that in the event that all datum requested by the present read command are stored in any one of the data areas of said buffer, and a first address of an area storing data requested by the present read command, of the data area is a subsequent address to a final address of an area storing data transferred to the exterior according to the past read command served for formation of the data area, of the data area, said read control means starts in accordance with the present read command a read-ahead from a subsequent address to an address in which data stored in a final address of the data area was stored, on said storage medium.

In the event that all datum requested by the present read command are stored in any one of areas of the buffer (this is referred to a "full hit"), and the present read command is a sequential command to the past read command served for formation of the data area, there is a high possibility that a sequential command to the present read command is further issued, since the present read command is a sequential command. Therefore, in the event that this condition is satisfied, the read-ahead is carried out. To carry out the read-ahead at the time of full hit, a provision of such a condition that the present read command is a sequential command to the past read command may prevent an increment of an overhead by an execution of useless read-ahead, and also prevent useless overwrite onto additional data areas.

In the event that only part of datum requested by the present read command exists in the buffer (this is referred to a "partial hit"), the insufficient datum are read out from the storage medium regardless of the fact that the present read command is a sequential command, and when an idle time exists until an issuance of the next read command, the read-ahead is carried out.

Incidentally, the storage device of the present invention can be understood as follows.

To achieve the above-mentioned objects, the present invention provides a storage device wherein data is read out from a storage medium in accordance with a read command entered from an exterior to be stored in a buffer, and the data stored in the buffer is transferred to the exterior, said storage device comprising:

determination means for determining whether data requested by the present read command is already stored in the buffer;

read control means for performing such a read-ahead that when data requested by the present read command is already stored in said buffer, the data designated by the present read command is read out from said buffer so as to be transferred to the exterior, and when data requested by the present read command is not stored in said buffer, and a vacant area storing no data exists in said buffer, datum on areas storing datum of an amount of datum designated by the present read command, of the read first address et seq. designated by the present read command, of the storage medium, is read out from said storage medium so as to be stored in areas of an address et seq. subsequent to a final address of an area in which data is already stored, and the data designated by the present read command is transferred to the exterior, and datum are read out continuously in turn from said storage medium so as to be stored in said buffer even after the termination of read out of data designated by the present read command from the storage medium; and weighting means for applying weighting according to a degree of an importance as to a save of data on the buffer to a data area storing datum on which addresses on said storage medium are continued on said storage medium, on said buffer, in accordance with an amount of residual datum not transmitted to the exterior, in the data area, wherein said read control means provides such a control that when data requested by the present read command is not stored in said buffer, and when no vacant area exists in said buffer, the datum of the amount of datum designated by the present read command is read out from areas of the read first address et seq. designated by the present read command, of the storage medium, so as to be stored in data areas of the first address et seq. of the data area of the minimum weight applied to said weighting means, of said buffer, and the data requested by the present read command, which is stored in the buffer, is transferred to the exterior, and in addition the read-ahead is carried out.

BRIEF DESCRIPTION OF THE DRAWINGS

FIG. 2 is a functional block diagram of the magnetic disk unit shown in FIG. 1.

FIG. 3 is a memory map of a read buffer for storing data read out from a magnetic disk in the form of cache data.

FIG. 4 is a memory map of a read buffer for storing data read out from a magnetic disk in the form of cache data.

FIG. 5 is a memory map of a read buffer for storing data read out from a magnetic disk in the form of cache data.

FIG. 6 is a memory map of a read buffer for storing data read out from a magnetic disk in the form of cache data.

DETAILED DESCRIPTION OF PREFERRED EMBODIMENTS

Hereinafter, there will be described a storage device according to an embodiment of the present invention.

Figure 1:
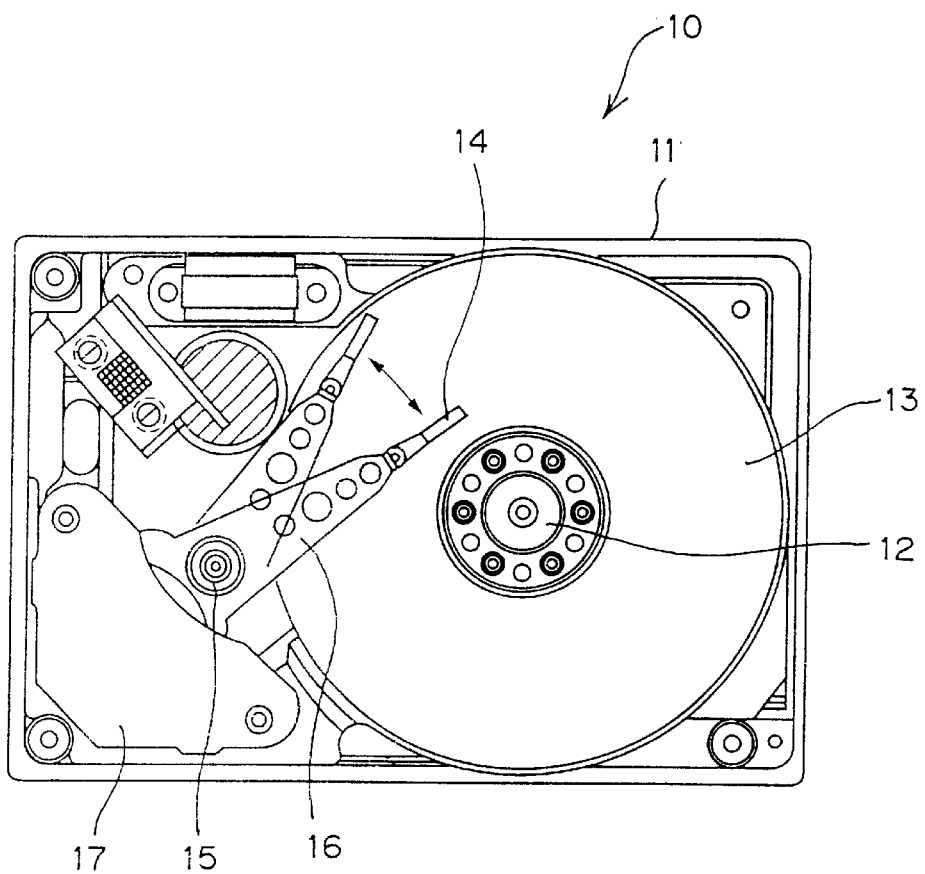
FIG. 1 is a view showing an internal structure of a magnetic disk unit according to an embodiment of a storage device of the present invention.

FIG. 1 is a view showing an internal structure of a magnetic disk unit according to an embodiment of a storage device of the present invention.

A housing 11 of a magnetic disk unit 10 accommodates a magnetic disk 13 driven by a spindle motor 26 (cf. FIG. 2). The magnetic disk 13 rotates on a rotating shaft 12. While the housing 11 is covered by a cover (not illustrated), FIG. 1 shows a state that the cover is removed.

The magnetic disk 13 corresponds to an example of the storage medium referred to the present invention. The housing 11 of the magnetic disk unit 10 further accommodates a floatation head slider 14 opposing to the magnetic disk 13, a carriage arm 16 on the top of which the floatation head slider 14 is fixed, the carriage arm 16 rotating on a rotary shaft 15, and an actuator 17 for driving the carriage arm 16 on a rotatable basis with a voice coil motor 25 (cf. FIG. 2). To read data stored in the magnetic disk 13, the carriage arm 16 is rotatably driven by the voice coil motor 25 mounted on the actuator 17, so that the floatation head slider 14 is subjected to a positioning to a desired track on the magnetic disk 13. A magnetic head 28 (cf. FIG. 2) is mounted on the floatation head slider 14. The magnetic head 28 sequentially magnetically picks up information stored in the magnetic disk 13 as the magnetic disk 13 rotates, and outputs the same in the form of an electric signal.

FIG. 2 is a functional block diagram of the magnetic disk unit shown in FIG. 1.

The magnetic disk unit comprises a buffer memory 18, a hard disk controller 19, a program memory 20, a read/write circuit 21, a CPU (including a RAM for the CPU) 22, an oscillator 23, a servo controller 24, the voice coil motor 25, the spindle motor 26, a head IC 27, the magnetic head 28, and the magnetic disk 13 which is also shown in FIG. 1.

As mentioned above, the magnetic disk 13 is driven by the spindle motor 26 so that the magnetic disk 13 rotates on the rotating shaft 12, and the magnetic head 28 is fixed on the top of the carriage arm 16 (cf. FIG. 1), so that the carriage arm 16 is driven on a rotary basis, and whereby the magnetic head 28 is driven.

The servo controller 24 incorporates therein a voice coil motor driving circuit for driving the voice coil motor 25 and a spindle motor driving circuit for driving the spindle motor 26. The servo controller 24 drives the voice coil motor 25 and the spindle motor 26 in accordance with an instruction from the CPU 22.

Information stored in the magnetic disk 13 is picked up by the magnetic head 28 and converted to an electric signal. The electric signal is converted into a predetermined data format of signal by passing through the head IC 27 and transferred to the read/write circuit 21. On the other hand, when information is written into the magnetic disk 13, the read/write circuit 21 transfers writing data to the head IC 27, and the magnetic head 28 stores information associated with the writing data in the magnetic disk 13.

The hard disk controller 19 performs transmit receive operations for data and command between it and a host system (not illustrated). When the hard disk controller 19 receives from the host system writing data into the magnetic disk 13 together with a write command, the hard disk controller 19 informs the CPU 22 of the write command, so that the CPU 22 causes the servo controller 24 to generate such an instruction that the magnetic head 28 is driven to a desired address position on the magnetic disk 13. The hard disk controller 19 further provides such a control that after the data is temporarily stored in the buffer memory 18, the data is read from the buffer memory 18, and then transferred to the read/write circuit 21, and thus the hard disk controller 19 instructs the writing. On the other hand, when the hard disk controller 19 receives the read command from the host system, the hard disk controller 19 informs the CPU 22 of the read command, so that the CPU 22 causes the servo controller 24 to generate such an instruction that the magnetic head 28 is driven to a desired address position on the magnetic disk 13. The hard disk controller 19 further instructs the read/write circuit 21 to read out the data from the magnetic disk 13, and receives the data read out from the magnetic disk 13 from the read/write circuit 21 and stores the same in the buffer memory 18. The hard disk controller 19 further reads data, which is requested by the received read command, from the buffer memory 18, and then transfers the same to the host system.

The CPU 22 reads and executes a program, which is stored on the program memory 20, in synchronism with a clock generated by the oscillator 23, so that the CPU 22 controls the magnetic disk unit 10 in its entirety.

Aspects of the present embodiment reside in contents of a program operating in the program memory 20 when the host system issues a read command, and operational contents of the hard disk controller 19 and the like operating in accordance with the program operating in the program memory 20. First, hereinafter, there will be explained a state that a cache data is stored in the buffer memory 18.

FIGS. 3 to 14 are memory maps of the read buffer for storing data read out from the magnetic disk 13 in the form of cache data, of the buffer memory 18.

FIG. 3 shows an initial state that no cache data exists in the read buffer. The buffer first address and the buffer final address are set up when a power source for the magnetic disk unit 10 shown in FIGS. 1 and 2 turns on.

Here, when the host system issues a read command ①, as shown in FIG. 4, data *a requested by the read command ① and the subsequent read-ahead data *b are read out from the magnetic disk 13, and datum are stored in turn from the buffer first address of the read buffer.

A ring first address and a ring final address, as shown in FIG. 4, are respectively a first address and a final address of an area wherein datum are overwritten on a circulation basis in such a manner that when reading of data from the magnetic disk 13 is continued, datum are stored in turn from the ring first address of the read buffer, and when datum are stored up to the ring final address, the subsequent data is overwritten returning to the ring first address. But, when ones between the ring first address and the ring final address are filled with read-ahead datum, the overwriting is stopped, at that time point. Further, as will be described, in the even that an overwrite inhibit area exists, the overwriting is inhibited for that area.

Those ring first address and the ring final address are coincident with the buffer first address and the buffer final address, respectively, just after the turn off of the power source to the magnetic disk unit 10, or just after the reset.

In the event that while the read-ahead for the read command ① shown in FIG. 4 is continued, a random read command for the read command ①, which is not a sequential read command for the read command ①, but a read command requesting that data is read from an address (an address which does not satisfy a definition of a "gap read command" which will be described later), which is quite different from the address read in accordance with the read command ①, on the magnetic disk, is issued, the read-ahead for the read command ① is stopped, and as shown in FIG. 5, data *c requested by a read command ② and the subsequent read-ahead data *d are stored in turn from the ring first address (a next address of the final address of an area ① in which the data *a and the data *b read out from the magnetic disk in accordance with the read command ① are stored) shown in FIG. 5.

In this case, the cache data area (an area on the read buffer in which datum of continuous addresses on the magnetic disk are stored) comprises two types of area of the area ① and the area (*c+*d)

On the other hand, in the event that while the read-ahead for the read command ① shown in FIG. 4 is continued, a read command ③, wherein an address advanced by the correspondence less than the number of sectors of a +1 track (within a range in which the magnetic disk physically rotates one turn) for the final read address of the read command ①, on the magnetic disk, is regarded as a read first address (a read command satisfying this condition is referred to as the "gap read command"), is issued, as shown in FIG. 6, a read-ahead *b2 subsequent to the previous read-ahead *b1 is carried out, data *c requested by the subsequent read command ③ is read out from the magnetic disk and is stored in the read buffer, and further read-ahead *d is carried out. In this case, the datum *a, *b1, *b2, *c and *d are datum of the addresses sequentially continued. Thus, the combination of the respective areas for storing those datum *a, *b1, *b2, *c and *d is defined as a one cache data area. In this manner, here, an area on the read buffer, which may be partitioned with a discontinued points of addresses on the magnetic disk, is referred to as the cache data area.

When the cache data area is formed on the read buffer, the cache data area is weighted in accordance with a data amount of data which has not been transferred to the host system. Basically, a larger weight is applied with a larger data amount of data which has not been transferred to the host system. However, when the data amount exceeds a predetermined upper limit, such a cache data area is removed from such a treatment that it is the cache data area which is maximum in "weight", in the event that a plurality of cache data areas exist on the read buffer, since a storage area for data, which is newly read out from the magnetic disk in accordance with a new read command, is extremely restricted.

Figure 7:
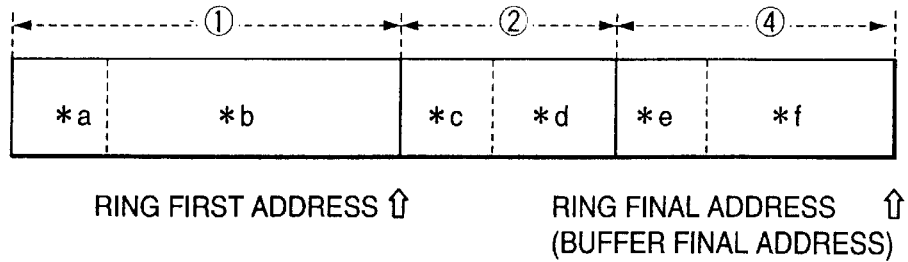
FIG. 7 is a memory map of a read buffer for storing data read out from a magnetic disk in the form of cache data.

FIG. 7 shows a state that three cache data areas ①, ② and ④ exist on the read buffer, and the read buffer is filled with these three cache data areas. It is assumed that a data amount of data, which has not been transmitted to the host system, does not exceed the upper limit in any of those three cache data areas ①, ② and ④, and a larger weight is applied with a larger data amount of data which has not been transmitted to the host system (here, in an order of ①>④>②).

Figure 8:
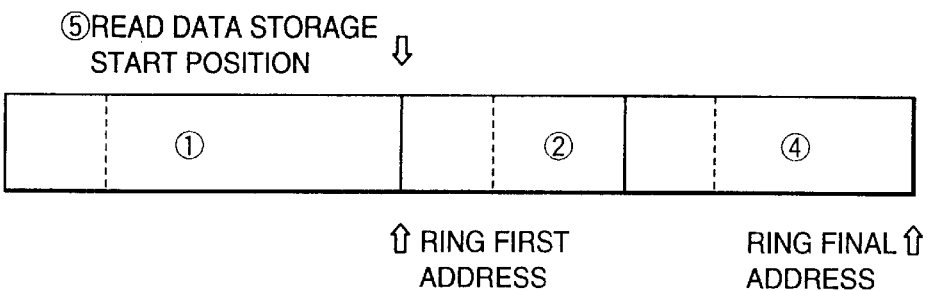
FIG. 8 is a memory map of a read buffer for storing data read out from a magnetic disk in the form of cache data.

Assuming that the host system issues a read command ⑤, and data requested by the read command ⑤ does not exist on any of the cache data areas ①, ② and ④ (this is referred to "not fit"), data is read out from the magnetic disk in accordance with the read command ⑤, so that the data thus read is stored in turn from the first address of the area ②, which is the minimum cache data area in "weight", as shown in FIG. 8.

Figure 9:
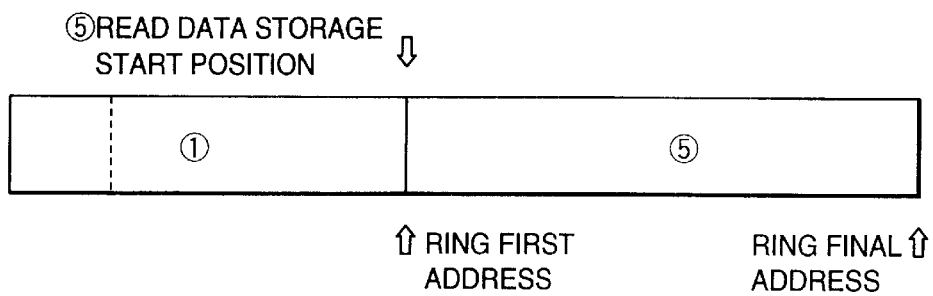
FIG. 9 is a memory map of a read buffer for storing data read out from a magnetic disk in the form of cache data.

FIG. 9 shows a state that data according to the read command ⑤ is stored in the read buffer from the state shown in FIG. 8 and thereafter sequential read commands are sequentially issued. When the sequential read commands are sequentially issued, only data in the read buffer area ⑤, which is set up with the ring first address and the ring final address, on the read buffer is stored, and data in the cache data area ①, which is maximum in "weight", is kept to be maintained.

Figure 10:
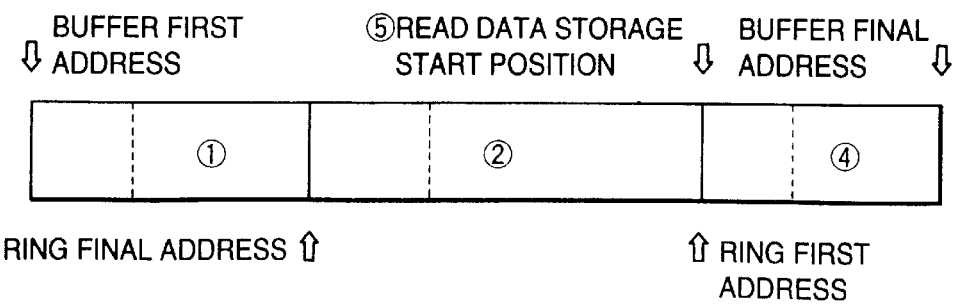
FIG. 10 is a memory map of a read buffer for storing data read out from a magnetic disk in the form of cache data.

FIG. 10 shows the same state as FIG. 7, that is, a state that three cache data areas (①, ② and ③ exist on the read buffer, and the read buffer is filled with these three cache data areas. It is assumed, however, that a data amount of data, which has not been transmitted to the host system, is given in an order of ②>①>④. And a larger weight is applied in accordance with this order. In this case, the ring first address is set up to the first address of the cache data area ④, which is minimum in "weight", and the ring final address is set up to the address immediately before the first address of the cache data area ②, which is maximum in "weight". Consequently, in this state, the read command ⑤ is issued, and if the associated data does not fit to any of the cache data areas ①, ② and ④, the data associated with the read command ② is read out from the magnetic disk, and the data thus read is stored in turn from the ring first address on the read buffer.

Figure 11:
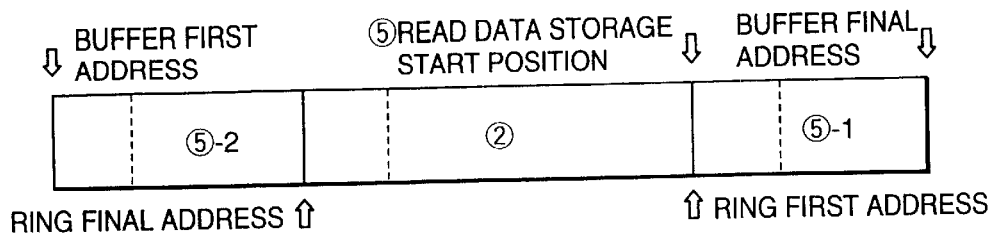
FIG. 11 is a memory map of a read buffer for storing data read out from a magnetic disk in the form of cache data.

FIG. 11 shows a state that the read command ⑤ is carried out in the state show in FIG. 10, and subsequently, the sequential commands are sequentially executed, wherein areas, in which datum are stored during the execution of the sequential commands, are areas ⑤-1 and ⑤-2 from the ring first address to the ring final address, while the cache data area ②, which is maximum in "weight", is kept to be maintained.

That is, here, a storage starting position for data associated with the read command ⑤ is coincident with the ring first address, and data is overwritten on a circulation basis skipping the cache data area ②, which is maximum in "weight", in such a way that when the sequential read command follows the read command ⑤, datum are stored to the buffer final address, and the subsequent data is stored in the buffer first address, and also thereafter datum are sequentially stored into the ring final address.

Figure 12:
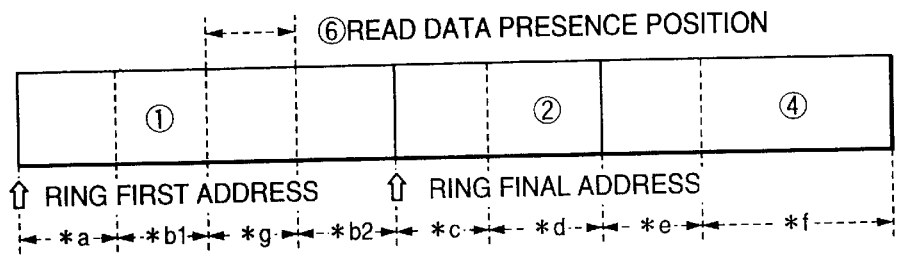
FIG. 12 is a memory map of a read buffer for storing data read out from a magnetic disk in the form of cache data.

FIG. 12 shows a state that three cache data areas ①, ② and ④ exist on the read buffer, as shown in FIG. 7, wherein a larger weight is applied with a larger data amount of data which has not been transmitted to the host system (here, in an order of ①>④>②), and in this state the read command ⑥ is issued.

In FIG. 12, *a denotes data requested by the read command ①; *b1, *b2 read-ahead datum after execution of the read command ①; *g read-ahead data after execution of the read command ① and data requested by the read command ⑥; *c data requested by the read command ②; *d read-ahead data after execution of the read command ②; *e data requested by the read command ④; and *f read-ahead data after execution of the read command ④.

It is assumed that the issued read command ⑥ is a read command (the whole datum requested by the read command are stored already therein), which is not the sequential read command (a command wherein an initial of *b1 is a read first address) for the read command ① (cf. FIG. 4) formed in accordance with which the cache data area ① is formed, but fully fits to the cache data area ①. At that time, while the read command ⑥ fully fits to the cache data area ①, but the read command ⑥ is not the sequential command. Thus, the read-ahead is not performed and data requested by the read command ⑥ is read out from the read buffer and transferred to the host system. Here, while the cache data area ① was maximum in the "weight", an execution of the read command ⑥ brings about the reduction of the data amount of data not transferred to the host system, and as a result the cache data area ① goes down in an order of the "weight". Thus, the order of the "weight" is changed to, for example, ④>①>②.

Figure 13:
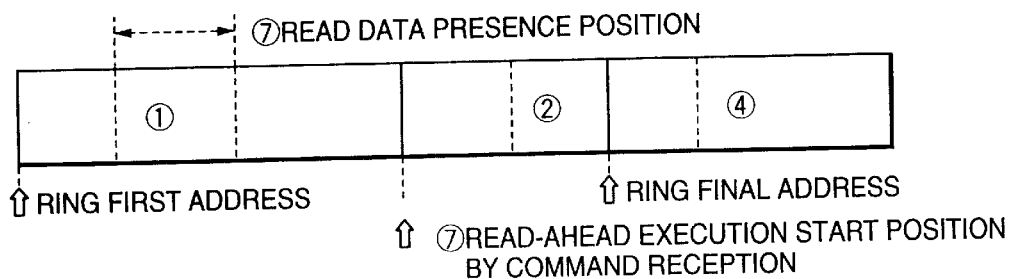
FIG. 13 is a memory map of a read buffer for storing data read out from a magnetic disk in the form of cache data.

FIG. 13 shows a state that three cache data areas ①, ② and ④ exist on the read buffer, as shown in FIG. 7, wherein a larger weight is applied with a larger data amount of data which has not been transmitted to the host system (here, in an order of ①>④>②), and in this state the read command ⑦ is issued. It is assumed that the issued read command ⑦ is the sequential read command for the read command ① (cf. FIG. 4) formed in accordance with which the cache data area ① is formed, and fully fits to the cache data area ①.

At that time, the read command ⑦ fits to the cache data area ①. Consequently, to transfer data requested by the read command ⑦, it is sufficient to read the data from the read buffer and transfer the same to the host system, and thus there is no need to access the magnetic disk. But the read command ⑦ is the sequential read command for the read command ①. Consequently, the read-ahead is further performed.

To perform the read-ahead, since the cache data area ① is maximum in the "weight", the ring first address and the ring final address are set up in such a manner that the maximum "weight" for the cache data area ① is released, and the "weight" for the cache data area ④, which has the second large weight, is established to the maximum "weight", so as to avoid an overwrite onto the cache data area ④ of the maximum "weight", and datum sequentially read from the address subsequent to the final address on an area storing the read-ahead data *b2 (cf. FIG. 12), on the magnetic disk are stored in turn from the subsequent data (the first address of the cache data area ②) of the final address (the final address of the cache data area ①) for the read-ahead of execution of the read command ①, on the read buffer.

Figure 14:
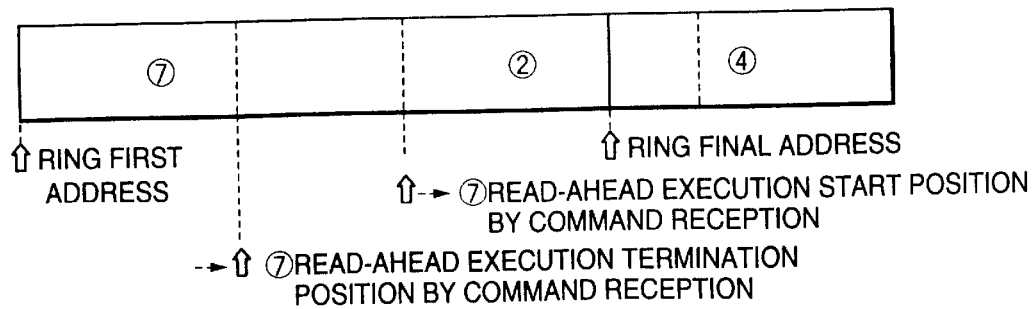
FIG. 14 is a memory map of a read buffer for storing data read out from a magnetic disk in the form of cache data.

FIG. 14 shows a state that after execution of the read command ⑦, a read-ahead is further performed, and the read-ahead is terminated before the subsequent read command is issued.

Read-ahead datum are stored in turn from the first address of the cache data area ②. When the read-ahead datum are stored up to the ring final address which is the final address of the cache data area ②, then the read-ahead datum are stored in turn from the ring first address set up on the first address (the first address of the read buffer) of the cache data area ①, and as shown in FIG. 13, the read-ahead datum are stored up to the final address of an area (⑦ read data presence position shown in FIG. 13) in which data requested by the read command ⑦ is stored, and thus the read-ahead is terminated. At this stage, the cache data area ④ is kept to be maintained, and the read-ahead datum are stored in the whole areas on the read buffer, but the cache data area ④.

Next, there will be explained programs to be executed by the CPU 22 shown in FIG. 2 for implementing the above-mentioned operations.

FIGS. 15 to 19 are flowcharts of a read control program to be executed when a read command is received. Those flowcharts show the process to be executed by the CPU 22 shown in FIG. 2 and the process to be executed by the hard disk controller 19 instructed by the CPU 22 without a distinction.

The programs shown in FIGS. 15 to 19 basically start their operations in response to a read command when a magnetic disk is not accessed (when the read-ahead is stopped). But as will be described later, it happens that after receipt of the read command, the read-ahead stop processing is performed, and thereafter those programs are re-started.

Figure 15:
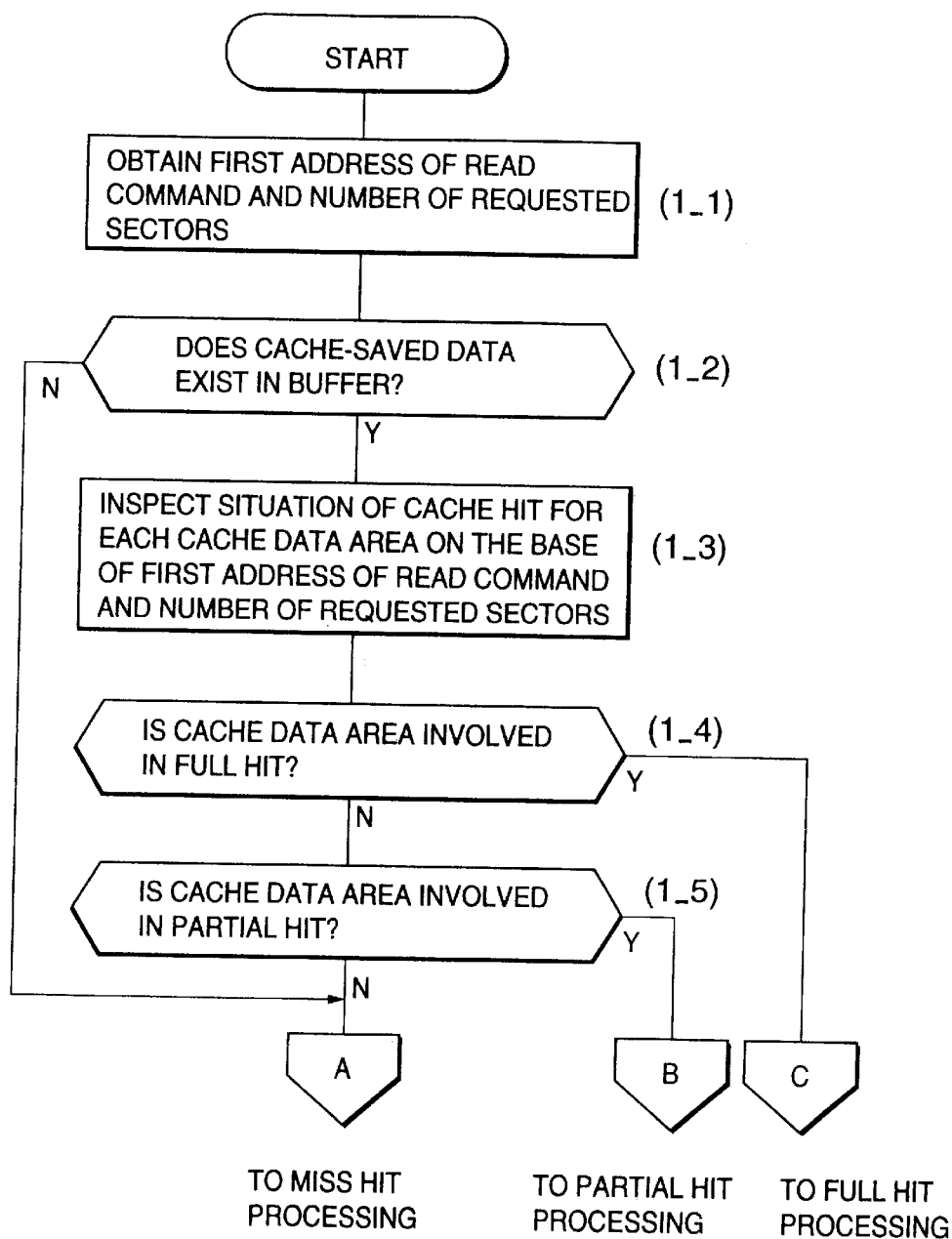
FIG. 15 is a flowchart of a read control program to be executed when a read command is received.

When the program is started in response to the issuance of the read command, first, in step 1_1 of FIG. 15, the read first address on the magnetic disk and information as to the requested sector number representative of the data amount requested are derived from the issued read command, and then in step 1_2, it is determined whether cache-saved data exists in the read buffer. When it is decided that no cache-saved data exists in the read buffer, in other words, when the read buffer is in an initial state that the read buffer is completely vacant, the process goes to a miss-hit processing (cf. FIG. 16).

In step 1_2, when it is decided that the cache-saved data exists in the read buffer, it is inspected in accordance with the first address and the requested sector number derived from the read command whether the present read command fits to the respective one of the cache data areas formed on the read buffer (step 1_3), and it is determined whether a cache data area involved in the full fit exists (step 1_4), and it is determined whether a cache data area involved in the partial fit exists (step 1_5). When it is decided that none of the cache data area involved in the full fit and the cache data area involved in the partial fit exists, the process goes to the miss-hit processing (cf. FIG. 16). On the other hand, when it is decided that the cache data area involved in the full fit and the cache data area involved in the partial fit exist, the process goes to a full-hit processing and a partial-hit processing (cf. FIG. 16), respectively.

Figure 16:
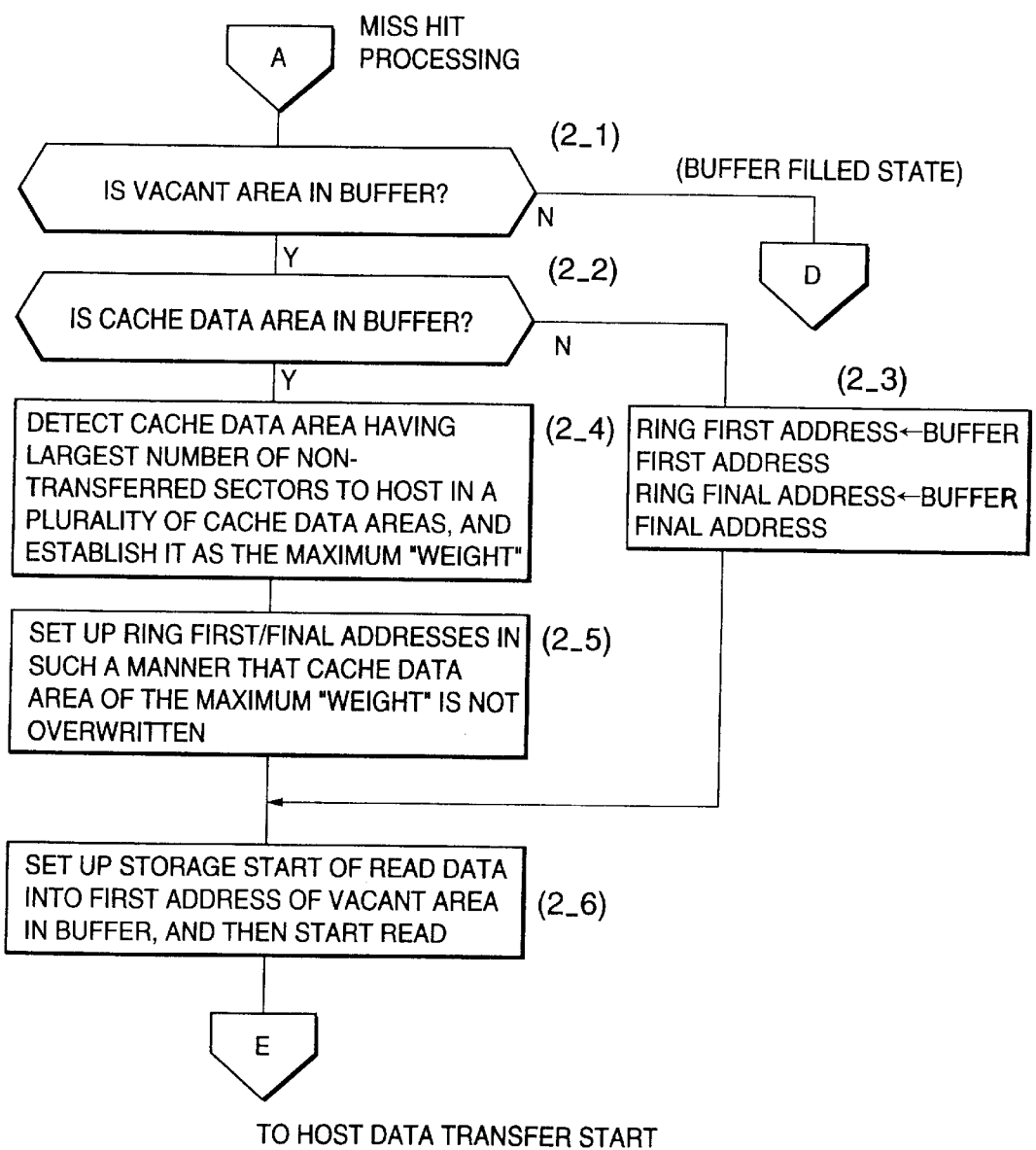
FIG. 16 is a flowchart of a read control program to be executed when a read command is received.

In the miss-hit processing shown in FIG. 16, it is determined whether a vacant area not cache-saved (an area of no cache data as shown in FIG. 4) exists in the read buffer (step 2_1). When it is decided that the read buffer is filled (no vacant area), the process goes to a miss-hit processing shown in FIG. 18. The miss-hit processing shown in FIG. 18 will be described later.

In the step 2_1, when it is decided that the vacant area exist in the read buffer, the process goes to a step 2_2 in which it is determined whether the cache data area exists in the read buffer. In the step 2_2, when it is decided that no cache data area exists in the read buffer, that is, the read buffer is in the initial state, the process goes to a step 2_3 in which the ring first buffer is set up to the buffer first address and the ring final buffer is set up to the buffer final address, and then the process goes to a step 2_6. The step 2_6 will be described later.

In the step 2_2, when it is decided that the cache data area exists in the read buffer, the process goes to a step 2_4 in which of a plurality of cache data areas, a cache data area having the largest number of non-transferred sectors is detected, and the "weight" of the cache data area thus detected is established as the largest one. Here, in the event that only one cache data area exists in the read buffer, the "weight" of the cache data area is established as the largest one.

In the event that a plurality of cache data areas exist in the read buffer, when a cache data area, which has too much number of non-transferred sectors, exists, such a cache data area is removed from such an establishment that the cache data area is of the largest "weight". That the number of non-transferred sectors is too much means that a size of the cache data area is too much. A size of a storage area of data read out from the magnetic disk is greatly restricted.

Next, the process goes to a step 2_5 in which the ring first address and the ring final address are set up in such a manner that the cache data area of the largest "weight" established in the step 2_4 is prevented from an overwriting.

Figure 17:
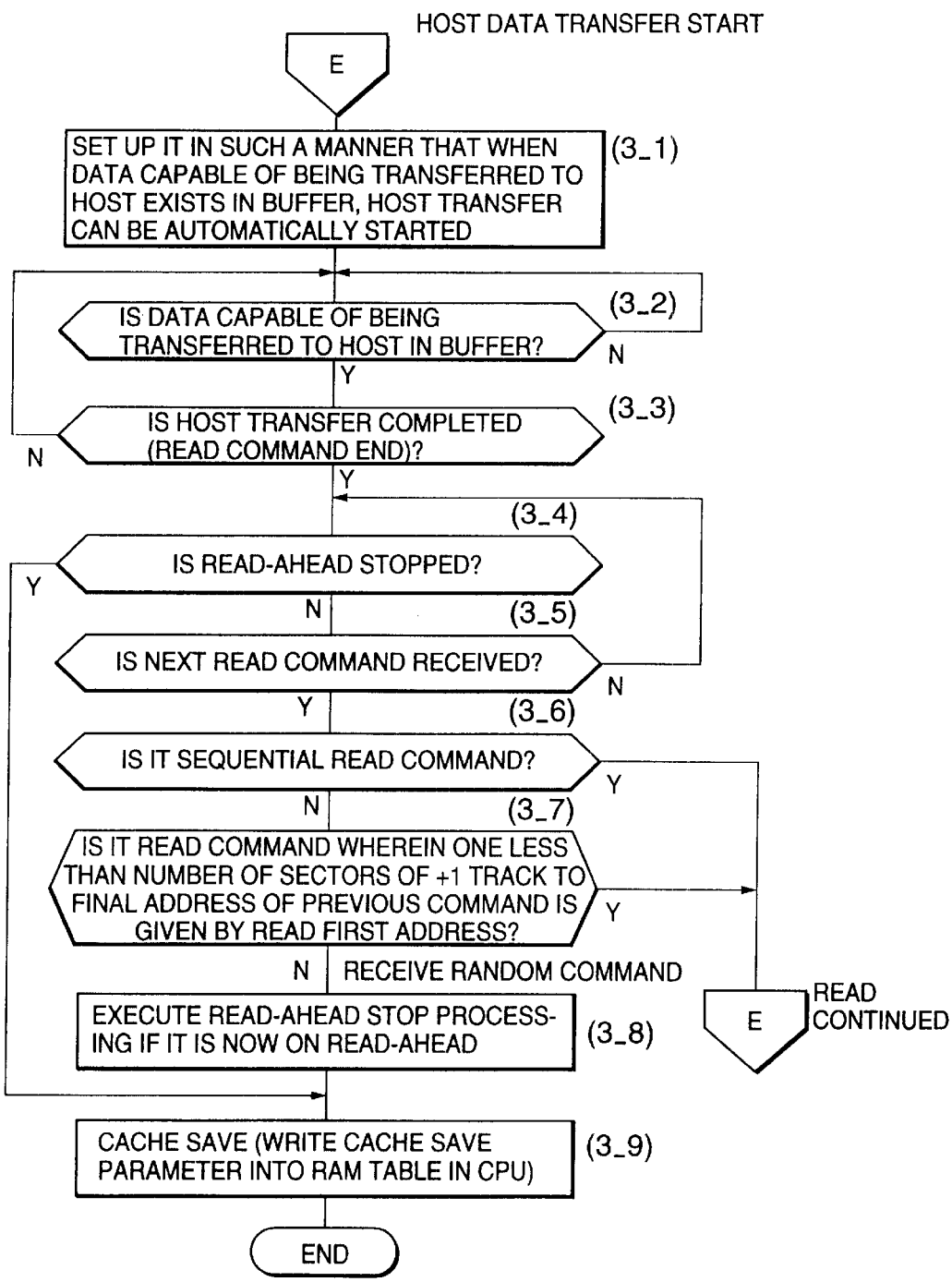
FIG. 17 is a flowchart of a read control program to be executed when a read command is received.

In the step 2_6, a storage address is set up in such a manner that datum read out from the magnetic disk are stored in turn from the first address of an empty area of the read buffer, a data read from the magnetic disk is started (the start is instructed to the hard disk controller 19), and the process goes to the data transfer processing to the host shown in FIG. 17. Hereinafter, the data read is automatically performed by the hard disk controller 19 shown in FIG. 2, and also after reading of the data requested by the present read command is terminated, usually, the read-ahead is continued.

In a step 3_1 shown in FIG. 17, issued to the hard disk controller 19 are instructions that when data transmittable to the host system exists in the read buffer, the data is automatically transferred to the host. Hereinafter, the hard disk controller 19 transfers in units of sector data to be transferred to the host system, of datum stored in the read buffer in accordance with the instructions.

In a step 3_2, it is monitored whether data transmittable to the host system exists in the read buffer. In a step 3_3, it is monitored whether a transfer of the data requested by the present read command to the host system is completed, or whether a processing according to the present read command is terminated.

In a step 3_4, it is monitored whether the read-ahead is stopped. When it is now on read-ahead, it is monitored whether the subsequent read command is received. For example, when it reaches the situation explained referring to FIG. 14 and then the read-ahead is terminated, the process goes to a step 3_9. The step 3_9 will be explained later.

In a step 3_6, upon receipt of the subsequent read command while the read-ahead is continued, it is determined whether the received read command is the sequential read command for the previous read command. In a step 3_7, it is determined whether the received read command is a read command (a gap read command) in which a read first address is defined with a number less than the number of sectors of physical +1 track, on the magnetic disk for the final address of the previous read command. When it is decided that the received read command is sequential read command or the gap read command, the process returns to the step 3_1 in which the data read from the magnetic disk is continued.

On the other hand, when it is decided that the present received read command is a random read command for the previous read command, the process goes to a step 3_8 in which read-ahead stop processing is performed.

In a step 3_9, a cache save (a processing for writing a cache save parameter, which will be described later, into a RAM table in the CPU) is performed.

Here, the cache save parameter comprises: a first address on the read buffer, of the cache data area; a first logical block address (a first LBA) on the magnetic disk, of data stored in the cache data area; a sector size of the cache data area; the number of non-transferred sectors to the host, of datum stored in the cache data area; and a LBA subsequent to the final LBA, which is determined in accordance with the read first address of the one's own read command, and the number of requested sectors, for determining whether the subsequent read command is the sequential command for oneself. Whenever the cache save is performed, a new cache data area is produced.

When the cache save in the step 3_9 is terminated, the process goes by this routine. But, in the event that the random read command is already received (cf. step 3_5 to step 3_8), this routine is resumed from the starting position shown in FIG. 15 so as to perform the processing for the read command.

Figure 18:
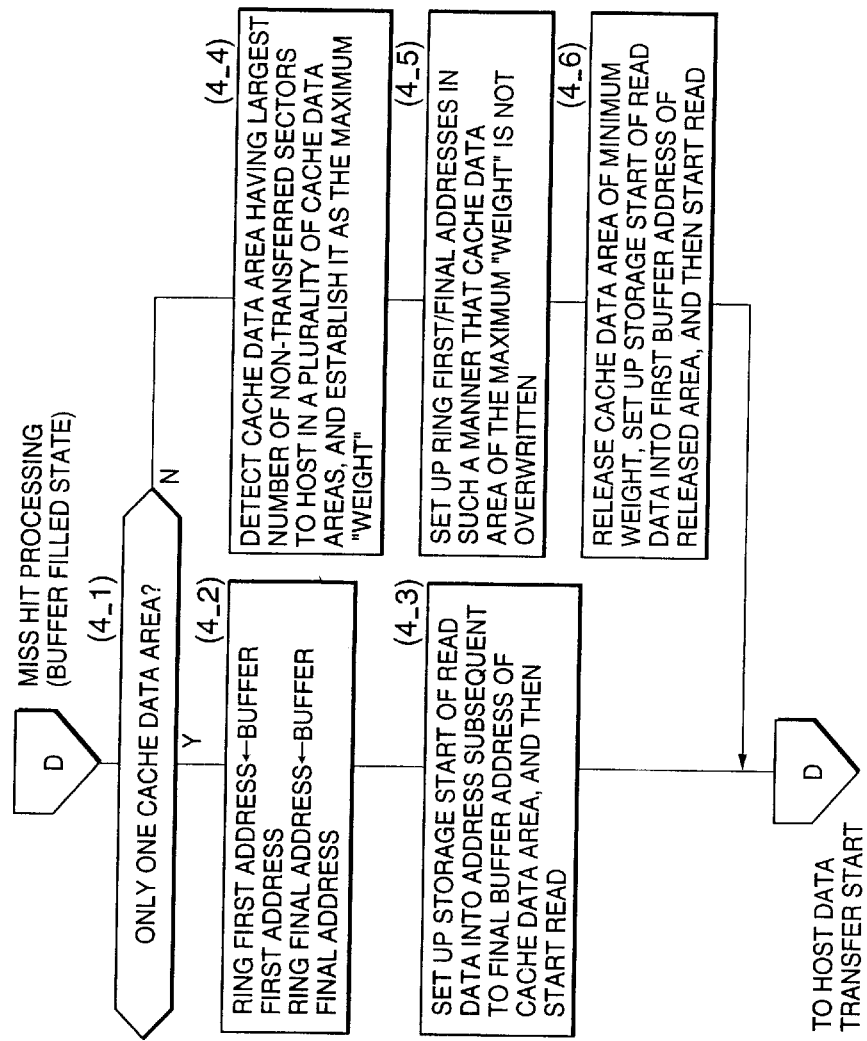
FIG. 18 is a flowchart of a read control program to be executed when a read command is received.

FIG. 18 shows a miss hit processing which is executed when the read buffer is filled in the step 2_1 in the miss hit processing shown in FIG. 16. In a step 4_1, it is determined whether only one cache data area exists in the read buffer (the read buffer is filled with the only one cache data area). When it is decided that only one cache data area exists in the read buffer, the process goes to a step 4_1 in which the ring first address is set up to be coincident with the buffer first address and the ring final address is set up to be coincident with the buffer final address. And then the process goes to a step 4_3 in which a storage address to the read buffer is set up so that the read datum from the magnetic disk are stored in turn from an address subsequent to the final address of only the cache data area, on the read buffer, and thereafter datum are read out from the magnetic disk.

Thereafter, the data transfer processing to the host system, which has been explained referring to FIG. 17.

Figure 19:
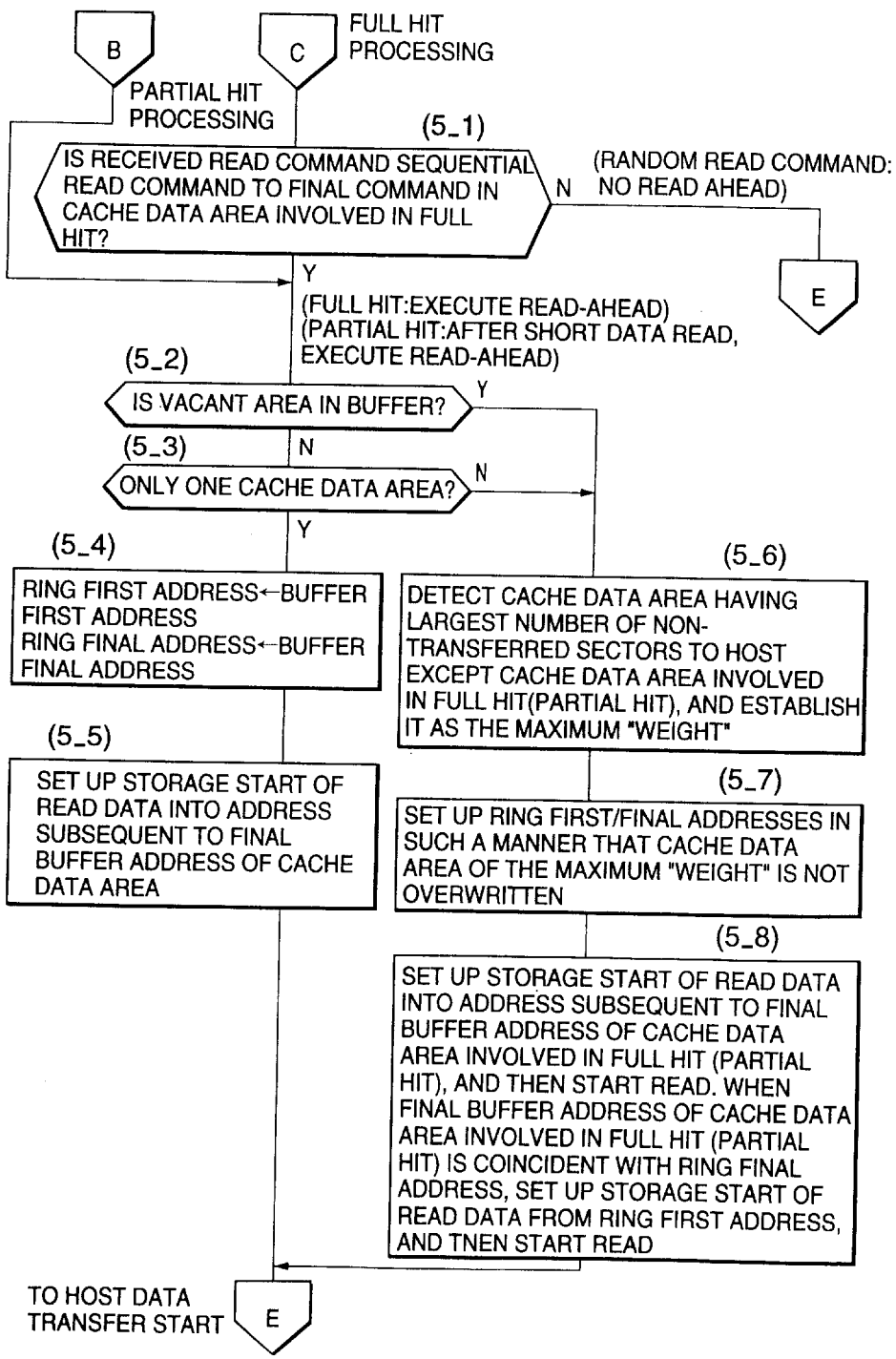
FIG. 19 is a flowchart of a read control program to be executed when a read command is received.

FIG. 19 relates to a processing in the event that in FIG. 15, it is decided that a cache data area involved in a partial hit or a full hit exists in the read buffer. In the full fit, the process starts from a step 5_1. In the partial fit, the process starts from a step 5_2.

In the step 5_1, it is determined whether the read command is a sequential read command for the final read command in the cache data area involved in the full hit (but in the event that one cache data area is formed by the read command on the basis of which the cache area is produced, or the final read command of a plurality of read commands explained referring to FIG. 6). When it is decided that the read command is not the sequential read command, the process goes to the data transfer processing to the host system, which has been explained referring to FIG. 17. At that time, the read-ahead is not performed.

In the step 5_1, it is decided that the read command is the sequential read command, the process goes to a step 5_2. The process goes to the step 5_2 when the full hit is concerned and the read command is the sequential read command, and when the partial hit is concerned regardless of the fact that the read command is the sequential read command.

In the step 5_2, it is determined whether a vacant area exists in the read buffer. In a step 5_3, it is determined whether only one data area exists in the read buffer.

When it is decided that no vacant area exists in the read buffer (a filled state), and only one cache data area exists in the read buffer, the process goes to a step 5_4. To the contrary, when it is decided that the vacant area exists in the read buffer, or when it is decided that while no vacant area exists in the read buffer, a plurality of cache data areas exist in the read buffer, the process goes to a step 5_6.

In the step 5_4, since the read buffer is filled with only one cache data area, the ring first address and the ring final address are set up in such a manner that they are coincident with the buffer first address and the buffer final address, respectively. In a step 5_5, the storage address to the read buffer is set up in such a manner that the storage is initiated from the address subsequent to the final address of the only cache data area. And then datum are read from the magnetic disk.

Thereafter, the process goes to the data transfer processing to the host system shown in FIG. 17.

On the other hand, when the process goes to the step 4_4, of a plurality of cache data areas existing in the read buffer, a cache data area, which has the largest number of non-transferred sectors is detected, and the "weight" of the cache data area thus detected is established as the largest one. Here, in the event that only one cache data area exists in the read buffer, the "weight" of the cache data area is established as the largest one. In the event that a plurality of cache data areas exist in the read buffer, when a cache data area, which has too much number of non-transferred sectors, exists, such a cache data area is removed from such an establishment that the cache data area is of the largest "weight". This is the same as the step 2_4.

Next, the process goes to a step 4_5 in which the ring first address and the ring final address are set up in such a manner that the cache data area of the largest "weight" established in the step 4_4 is prevented from an overwriting.

In the step 4_6, the cache data area of the minimum "weight" is released, and a storage address to the read buffer is set up in such a manner that datum read out from the magnetic disk are stored in turn from the first address of an area in which data read out from the magnetic disk is released, and thereafter a data read from the magnetic disk is started. Here, in the event that a vacant area exists in the read buffer, that vacant area is dealt with an area of the minimum "weight".

Thereafter, the process goes to the data transfer processing to the host system shown in FIG. 17.

According to the present embodiment, in the event that there is a need to release any one of the cache data areas and perform an overwrite thereon, the overwrite is performed on the cache data area of the minimum "weight", and a data storage is performed in such a manner that data of the cache data area of the maximum "weight" is saved. Therefore, it is possible to contribute to a great harmonization between the save of data obtained through a read-ahead and securing a storage area for data newly read out from the magnetic disk, and to improve an access speed.

Incidentally, while the present embodiment mentioned above relates to a magnetic disk unit having a magnetic disk, wherein datum are read out from the magnetic disk and transferred to the host system, the present invention is not restricted to the magnetic disk unit, but applicable to an apparatus or unit for reading out datum from any type of storage medium, such as an optical disk, a photomagnetic disk, a floppy disk, etc.

Further, according to the present embodiment, the "weighting" is applied to the respective cache data area in accordance with only an amount of datum not transferred to the exterior. However, it is acceptable that the "weighting" is applied in addition to the amount of datum not transferred to the exterior taking into account at least one of an access frequency, an elapsed time since the final access, and a number of times of an issuance of a read command since the final access. In this case, the smaller "weight" is established with the lower access frequency, the smaller "weight" is established with the longer elapsed time, and the smaller "weight" is established with the larger number of times of an issuance.

As mentioned above, according to the present invention, it is possible to contribute to a great harmonization between the save of data obtained through a read-ahead and securing a storage area for data newly read out from the magnetic disk, and to shorten an access speed.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A storage device wherein data is read out from a storage medium in accordance with a read command entered from an exterior identifying the data, the storage device storing the data in a buffer, and the data stored in the buffer is transferred to the exterior, said storage device comprising:

read control means for performing a read-ahead such that datum including the identified data and read-ahead data are read from the storage medium and stored in the buffer, wherein when data requested by a present read command is not stored in said buffer, the data designated by the present read command is read out from said storage medium and stored sequentially in a plurality of addresses of the data areas, and the data designated by the present read command is transferred to the exterior, and datum are read out continuously in turn from said storage medium to be stored in said buffer; and weighting means for individually applying weighting to a plurality of data areas in accordance with the relative sizes of the data areas having data not yet transmitted to the exterior, when a plurality of read commands are continuously executed.

2. A storage device according to claim 1, wherein said weighting means performs weighting for each data area in accordance with at least one of an access frequency to the data area, an elapsed time since the data area is subjected to the last access, and a number of times of an issuance of an external read command since the data area is subjected to the last access, as well as the amount of residual datum not transmitted to the exterior.

3. A storage device according to claim 1, wherein said read control means provides such a control that when data requested by the present read command is not stored in said buffer, the data designated by the present read command is read out from said storage medium so as to be stored in said data area with the minimum weight applied by said weighting means, of said buffer.

4. A storage device according to claim 2, wherein said read control means provides such a control that when data requested by the present read command is not stored in said buffer, the data designated by the present read command is read out from said storage medium so as to be stored in said data area with the minimum weight applied by said weighting means, of said buffer.

5. A storage device according to claim 3, wherein said read control means performs an overwrite in data areas of said buffer so that said data area with the maximum weight is the last data area of said buffer to be overwritten.

6. A storage device according to claim 4, wherein said read control means performs an overwrite in data areas of said buffer so that said data area with the maximum weight is the last data area of said buffer to be overwritten.

7. A storage device according to claim 5, wherein said weighting means performs weighting in such a manner that when said data area with the maximum weight in said buffer is accessed by said read control means, the maximum weight is applied to any data area of said buffer but the accessed data area.

8. A storage device according to claim 6, wherein said weighting means performs weighting in such a manner that when said data area with the maximum weight in said buffer is accessed by said read control means, the maximum weight is applied to any data area of said buffer but the accessed data area.

9. A storage device according to claim 3, wherein in the event that all datum requested by the present read command are stored in any one of the data areas of said buffer, and a first address of an area storing data requested by the present read command is a subsequent address to a final address of an area storing data transferred to the exterior according to the past read command that served for formation of the one data area, said read control means starts in accordance with the present read command a read-ahead from an address subsequent to said final address, on said storage medium.

10. A storage device according to claim 4, wherein in the event that all datum requested by the present read command are stored in any one of the data areas of said buffer, and a first address of an area storing data requested by the present read command is a subsequent address to a final address of an area storing data transferred to the exterior according to the past read command that served for formation of the one data area, said read control means starts in accordance with the present read command a read-ahead from an address subsequent to said final address, on said storage medium.

* * * * *